(12) United States Patent
Hong et al.

(10) Patent No.: US 9,283,982 B2
(45) Date of Patent: Mar. 15, 2016

(54) STEERING COLUMN

(71) Applicant: NAMYANG IND.CO., LTD., Ansan-si (KR)

(72) Inventors: Sung Jong Hong, Seoul (KR); Heung Joo Lee, Ansan-si (KR); Beom Suk Kim, Seoul (KR); Hee Chang Seo, Ansan-si (KR)

(73) Assignee: NAMYANG IND. CO., LTD., Ansan (KR)

( * ) Notice: Subject to any disclaimer, the term of this patent is extended or adjusted under 35 U.S.C. 154(b) by 0 days.

(21) Appl. No.: 14/356,133

(22) PCT Filed: Nov. 1, 2012

(86) PCT No.: PCT/KR2012/009103
§ 371 (c)(1),
(2) Date: May 2, 2014

(87) PCT Pub. No.: WO2013/066063
PCT Pub. Date: May 10, 2013

(65) Prior Publication Data
US 2014/0311274 A1    Oct. 23, 2014

(30) Foreign Application Priority Data
Nov. 3, 2011  (KR) .................. 10-2011-0113815
Nov. 1, 2012  (KR) .................. 10-2012-0122789

(51) Int. Cl.
*B62D 1/184*    (2006.01)
*B62D 1/18*     (2006.01)
(Continued)

(52) U.S. Cl.
CPC *B62D 1/184* (2013.01); *B62D 1/18* (2013.01); *B62D 1/185* (2013.01); *B62D 1/187* (2013.01)

(58) Field of Classification Search
CPC .......... B62D 1/18; B62D 1/184; B62D 1/185; B62D 1/187
See application file for complete search history.

(56) References Cited

U.S. PATENT DOCUMENTS

| | | | |
|---|---|---|---|
| 2008/0100050 A1* | 5/2008 | Menjak | B62D 1/195 280/777 |
| 2010/0000366 A1* | 1/2010 | Nomura et al. | 74/493 |
| 2011/0005346 A1* | 1/2011 | Kwon | 74/493 |

(Continued)

FOREIGN PATENT DOCUMENTS

| | | |
|---|---|---|
| JP | 11-278283 A | 10/1999 |
| KR | 10-2007-0117097 A | 12/2007 |

(Continued)

OTHER PUBLICATIONS

International Search Report for PCT/KR2012/009103 filed on Nov. 1, 2012.

*Primary Examiner* — Barry Gooden, Jr.

(57) ABSTRACT

Disclosed herein is a steering column, including: an inner tube; an outer tube formed in a hollow shape into which the inner tube is inserted and including a pair of telescope guides protruding to an outer circumferential surface thereof, a first slit cut in an axial direction between the pair of telescope guides, and a second slit cut toward both sides of a circumferential direction at one end of the first slit; and a control lever installed on the telescope guides, wherein the telescope guides have a taper that is formed obliquely along a lengthwise direction, and the operating force of the lever is uniformly maintained according to the position of the control lever in the lengthwise direction by means of the taper.

11 Claims, 5 Drawing Sheets

(51) Int. Cl.
*B62D 1/187* (2006.01)
*B62D 1/185* (2006.01)

(56) References Cited

U.S. PATENT DOCUMENTS

| | | | | |
|---|---|---|---|---|
| 2011/0088501 | A1* | 4/2011 | Park | 74/493 |
| 2011/0204610 | A1* | 8/2011 | Kwon | 280/775 |
| 2013/0055844 | A1* | 3/2013 | Kim | 74/492 |
| 2013/0186153 | A1* | 7/2013 | Tanaka | 70/187 |
| 2014/0196564 | A1* | 7/2014 | Bang et al. | 74/493 |
| 2014/0290424 | A1* | 10/2014 | Kwon | 74/493 |
| 2014/0305251 | A1* | 10/2014 | Wilkes et al. | 74/493 |
| 2014/0318302 | A1* | 10/2014 | Watanabe | 74/493 |
| 2015/0096404 | A1* | 4/2015 | Martinez et al. | 74/492 |
| 2015/0107398 | A1* | 4/2015 | Nagasawa et al. | 74/493 |
| 2015/0107399 | A1* | 4/2015 | Nagasawa et al. | 74/493 |

FOREIGN PATENT DOCUMENTS

| | | |
|---|---|---|
| KR | 10-2011-0063235 A | 6/2011 |
| KR | 10-2011-0096805 A | 8/2011 |

* cited by examiner

Fig. 6
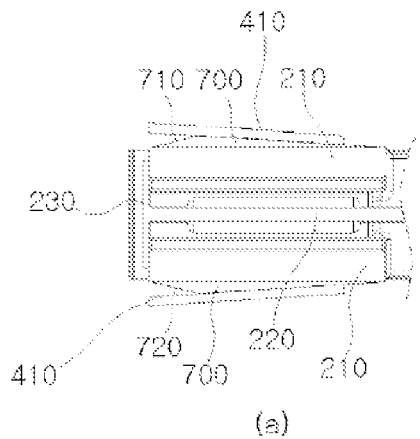
(a)
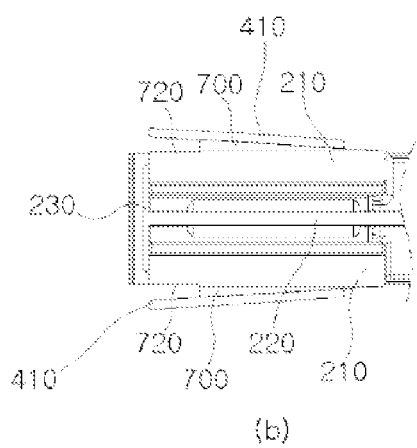
(b)
Fig. 7
Fig. 8
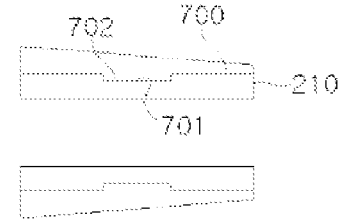

STEERING COLUMN

CROSS REFERENCE TO RELATED APPLICATION

This application is a national phase of PCT/KR2012/009103 filed on Nov. 1, 2012, which claims the benefit of Korean Patent Application No. 10-2011-0113815 filed on Nov. 3, 2011, and Korean Patent Application No. 10-2012-0122789 filed on Nov. 1, 2012, which are hereby incorporated by reference in their entirety into this application.

BACKGROUND OF THE INVENTION

1. Technical Field

The present invention relates to a steering column, and more particularly, to a steering column capable of minimizing a deviation in operating force of a control lever by a telescope operation.

2. Description of the Related Art

Generally, a steering column is an apparatus which is formed to enclose a steering shaft transferring rotational force generated by operating a steering wheel by a driver to a rack-pinion mechanism to support a rotation of the steering shaft and is coupled with a vehicle body through a bracket to fix a position of the steering shaft.

The steering column may further include a telescope function or a tilt function for convenience of a driver, in which the tilt is to control a fixed angle of the steering wheel and the telescope has two hollow tubes inserted thereinto so as to be able to be expanded and contracted in an axial direction and has a function of absorbing impact energy while the steering shaft and the steering column collapsing at the time of a collision of a vehicle.

Therefore, the steering column may be divided into a telescope type or a tilt type according to the foregoing function. In some cases, the tilt function may be added to the telescope type steering column and a driver may smoothly operate the steering wheel by controlling protrusions or a tilt angle of the steering wheel suiting a driver's height or body type using the foregoing functions.

As such, the telescope or tilt operation of the steering column is generally performed by allowing an outer tube to press or press-release an inner tube depending on a tightening operation and a tightening releasing operation of the control lever.

Further, for the outer tube to press the inner tube, the outer tube is provided with a slit in a lengthwise direction thereof, in which one end of the slit is opened and the other end thereof is closed.

However, the steering column according to the related art has a problem in that deformations of the outer tube are different due to the slit of which the one end is opened and the other end thereof is closed to cause a deviation in fixing force.

In detail, as the rigidity of the outer tube is minimal when the control lever is operated (tele-out) at the opened end of the slit, the deformation of the outer tube is maximal, but as the rigidity of the outer tube is maximal when the control lever is operated (tele-in) at the closed end of the slit, the deformation of the outer tube is minimal, such that the deviation in the fixing force occurs.

To improve the foregoing problem, the steering column of Korean Patent Laid-Open Publication No. 2011-0096805 (hereinafter, referred to as 'related art') is proposed and a schematic configuration of the steering column will be described with reference to FIG. 1.

As illustrated in FIG. 1, the steering column according to the related art is provided with a hollow-shaped inner tube 50 enclosing a steering shaft 75 and an outer tube 10 formed in a hollow shape into which the inner tube 50 is inserted and provided with telescope guides 35 which are opposite to each other in a lengthwise direction, protruding to an outer circumferential surface thereof to be provided with a control lever (not illustrated), in which the outer circumferential surface between the telescope guides 35 is provided with a first slit 20 cut in a direction of the steering shaft 75 and the outer circumferential surfaces of both ends of the telescope guides 35 each are provided with second slits 25 cut in a circumferential direction.

In this configuration, the second slits 25 are installed at both sides in a circumferential direction at portions of both ends of the first slit 20.

Therefore, the deviation in fixing force of the outer tube 10 is minimal at tele-in and tele-out positions by the second slit 25.

However, the steering column according to the related art has a problem in that to minimize the deviation in fixing force, the second slits need to be additionally machined and thus the a machining effort is increased to cause an increase in manufacturing costs.

Therefore, there is a need to develop a steering column overcoming the foregoing problems.

SUMMARY OF THE INVENTION

An object of the present invention is to provide a steering column capable of minimizing a deviation in operating force of a control lever by a telescope operation.

According to an exemplary embodiment of the present invention, there is provided a steering column, including: an inner tube; an outer tube formed in a hollow shape into which the inner tube is inserted and including a pair of telescope guides protruding to an outer circumferential surface thereof, a first slit cut in an axial direction between the pair of telescope guides, and a second slit cut toward both sides of a circumferential direction at one end of the first slit; and a control lever installed on the telescope guides, wherein the telescope guides have a taper that is formed obliquely along a lengthwise direction, and the operating force of the lever is uniformly maintained according to the position of the control lever in the lengthwise direction by means of the taper.

The taper may be provided with a contact avoidance part.

The taper may be provided with a reverse tilt part.

The taper may be attached on an outer surface of the telescope guide.

The taper and the telescope guide may be configured in a separation structure, one of opposing surfaces of the taper and the telescope guide may be provided with a coupling groove, and the other one of other opposing surfaces of the taper and the telescope guide on which the coupling groove is not formed may be provided with a coupling protrusion.

The taper may be integrally formed with the telescope guide.

The other end of the first slit may be provided with a third slit cut toward both sides of a circumferential direction.

BRIEF DESCRIPTION OF THE DRAWINGS

FIG. 6 is a plan view of a taper according to another exemplary embodiment of the present invention.

FIG. 7 is an enlarged plan view of a telescope guide according to an exemplary embodiment of the present invention of FIG. 5.

FIG. 8 is an enlarged plan view of a telescope guide according to another exemplary embodiment of the present invention of FIG. 5.

DESCRIPTION OF THE EXEMPLARY EMBODIMENTS

Hereinafter, exemplary embodiments of the present invention will be described with reference to the accompanying drawings.

To more easily understand the description of the apparatus, the 'upper portion (up)', 'lower portion (down)' 'left', 'right', 'front', and 'rear' disclosed in the description of the invention and claims are arbitrarily set to be defined based on the drawings and therefore it is to be noted that theses directions are not an absolute direction.

Figure 1:
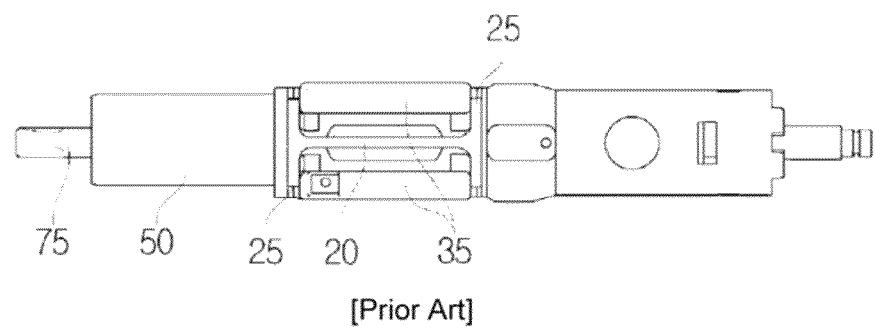
FIG. 1 is a plan view illustrating the steering column according to the related art.
Figure 2:
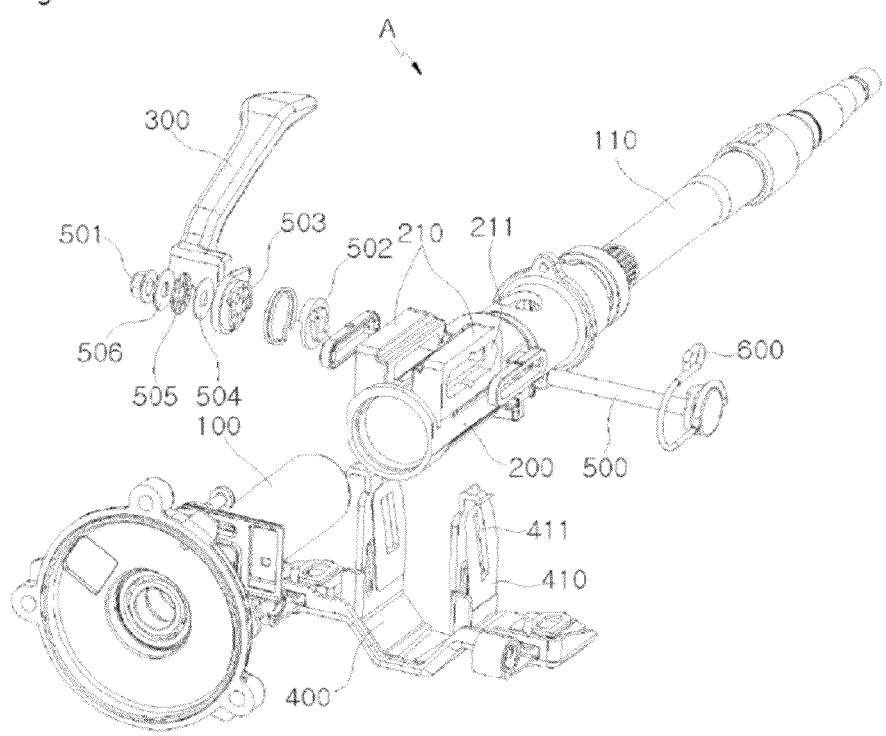
FIGS. 2 and 3 are exploded perspective views of a steering column according to an exemplary embodiment of the present invention.
Figure 3:
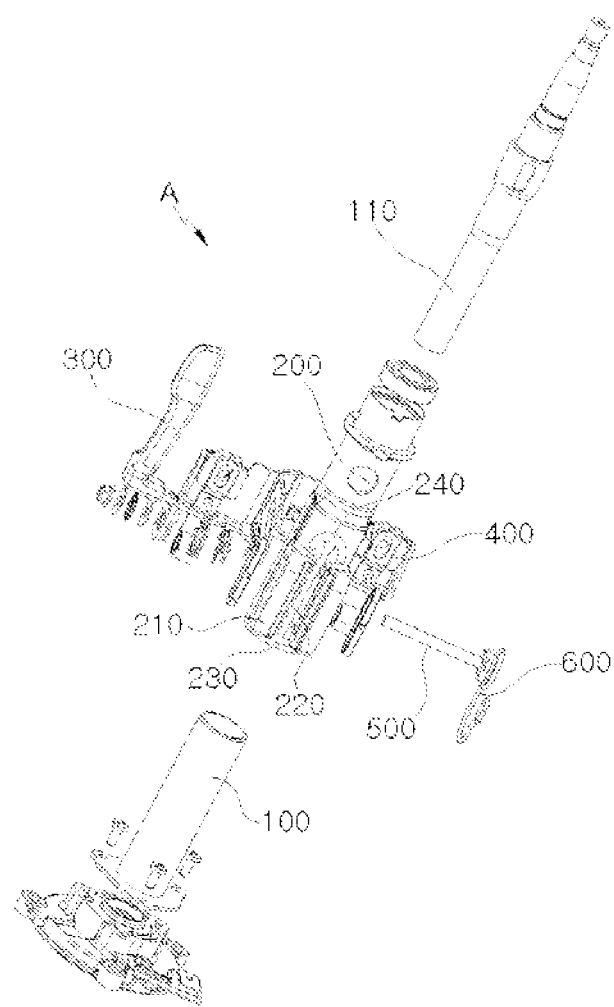
Figure 4:
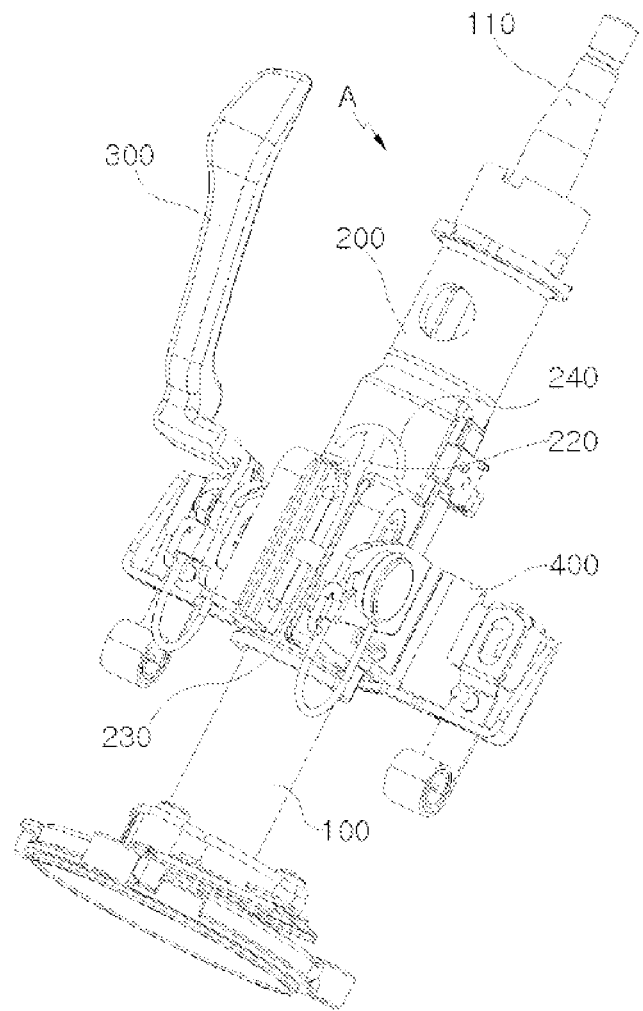
FIG. 4 is a perspective view illustrating a coupled state of the steering column of FIG. 2.
Figure 5:
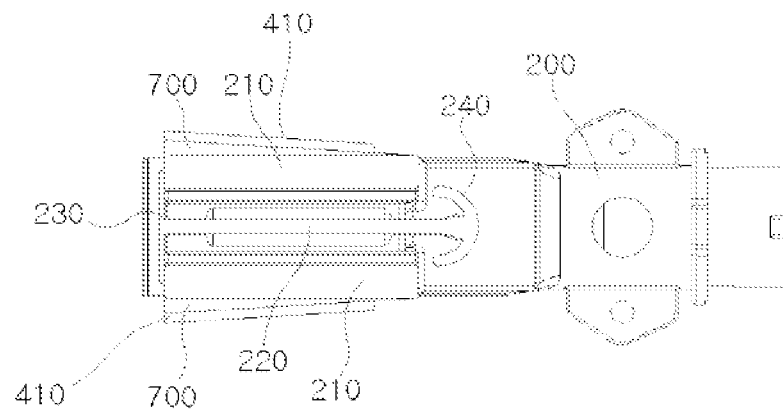
FIG. 5 is a plan view of an outer tube of FIG. 2.
Figure 9:
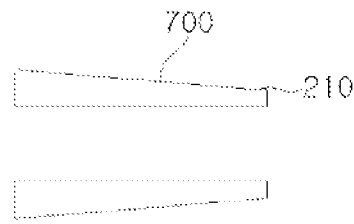
FIG. 9 is an enlarged plan view of a telescope guide according to still another exemplary embodiment of the present invention of FIG. 5.

FIGS. 2 and 3 are exploded perspective views of a steering column according to an exemplary embodiment of the present invention, FIG. 4 is a perspective view illustrating a coupled state of the steering column of FIG. 2, FIG. 5 is a plan view of an outer tube of FIG. 2, FIG. 6 is a plan view of a taper according to another exemplary embodiment of the present invention, FIG. 7 is an enlarged plan view of a telescope guide according to an exemplary embodiment of the present invention of FIG. 5, FIG. 8 is an enlarged plan view of a telescope guide according to another exemplary embodiment of the present invention of FIG. 5, and FIG. 9 is an enlarged plan view of a telescope guide according to still another exemplary embodiment of the present invention of FIG. 5.

First, to help understand the present invention, a steering column will be described.

As illustrated in FIGS. 2 to 9, a steering column A according to an exemplary embodiment of the present invention is configured of a hollow-shaped inner tube 100 enclosing a steering shaft 110 and an outer tube 200 formed in a hollow shape into which the inner tube 100 is inserted and provided with a pair of telescope guides 210 protruding to an outer circumferential surface thereof, a control lever 300 installed on the telescope guide 210 to perform a tightening operation and a tightening releasing operation so as to perform a telescope or tilt operation of the steering column A, and a mounting bracket 400 fixed to the outer tube 200, enclosing the outer circumferential surface of the outer tube 200.

Further, the pair of telescope guides 210 is provided with telescope long holes 211, the telescope long hole 211 is transversely provided with a tilt bolt 500, and an end thereof protruding across the telescope long hole 211 of the tilt bolt 500 is provided with the control lever 300 by a nut 501.

Further, the mounting bracket 400 is provided with a tilt guide 410 and the tilt guide 410 is provided with a tilt long hole 411. That is, the mounting bracket 400 and the outer tube 200 are fixed while the tilt guide 410 encloses both sides of the telescope guide 210 and the tilt bolt 500 crosses the tilt long hole 411.

Meanwhile, the end protruding across the telescope long hole 211 and the tilt long hole 411 of the tilt bolt 500 is sequentially fitted with a driven cam 502, a driving cam 503 formed on the control lever 300, a washer 504, a needle bearing 505, and a washer 506, all of which are fixed by the nut 501.

Further, a portion at which the driving cam 503 and the driven cam 502 face each other is repeatedly formed with a mountain-like portion and valley-like portion and thus the driven cam 502 performs a tip movement in a lengthwise direction of the tilt bolt 500 by the rotation of the control lever 300 and tightening and tightening releasing of the outer tube 200 and the inner tube 100 and tightening and tightening releasing of the outer tube 200 and the mounting bracket 400 are performed.

Further, the tilt bolt 500 or the control lever 300 are provided with a return spring 600 to return the control level after the control lever rotates.

Further, the outer tube 200 is provided with a first slit 220 cut in an axial direction between the pairs of telescope guides 210 and one end of the first slit 220 is provided with a second slit 230 cut toward both sides of a circumferential direction. The first slit 220 and the second slit 230 are connected to each other.

Meanwhile, it is to be noted that the first slit 220 may be installed to be opened to the left based on FIG. 5. In this case, the second slit 230 may not be installed at the outer tube 200.

That is, the outer tube 200 provided with the first slit 220 is expanded and contracted in a diameter direction by the operation of the control lever 300 to press or press-release the inner tube 100 and allow the tilt guide 410 to press or press-release the telescope guide 210 to control the telescope of the steering column A.

Further, the tilt bolt 500 moves along the tilt guide 410 by the operation of the control lever 300 to perform of the tilt operation of the steering column A.

Meanwhile, in the steering column A according to the embodiment of the present invention, as an end of the first slit 220 is opened and the other end thereof is closed by the second slit 230 and thus the deformations of the outer tube 200 are different at the time of the operation of the control lever 300, the deviation in the lever operating force occurs when the tilt bolt 500 including the control lever 300 is fixed moving along the telescope guide 210.

In detail, the left outer tube 200 provided with the first slit 220 opened by the second slit 230 is referred to as a 'free end' and the closed right outer tube 200 of the first slit 220 is referred to as a 'confinement end', in which the free end of the outer tube 200 has large conformance in response to an external pressing force and thus is easily tightened and the confinement end of the outer tube 200 has small conformance in response to an external pressing force and thus is not easily tightened.

In addition, the confinement end of the outer tube 200 is formed thickly so as not to be damaged due to the frequent pressing or pressing releasing. In this case, the rigidity of the confinement end of the outer tube 200 is larger than that of the free end.

Consequently, the deviation in the lever operating force of the control lever 300 is large depending on at which position of the free end and the confinement end of the outer tube 200 the control lever 300 is installed.

As such, to prevent the deviation in the lever operating force of the control lever 300 from occurring, an outside (upper and lower portions based on FIG. 5) of the telescope guide 210 is provided with a taper 700.

The exemplary embodiment of the present invention describes the steering column by way of example but is not limited thereto and therefore may be applied to various types of steering columns to which the method of allowing the outer tube to fix the inner tube by the slit is applied.

Hereinafter, the taper 700 according to the exemplary embodiment of the present invention will be described.

As illustrated in FIGS. 4 to 9, the taper 700 is obliquely formed upward (from the right to the left of FIG. 5) in the second slit 230 direction of the first slit 220.

Therefore, even though the position of the control lever 300 is changed by the telescope operation, the deviation in the lever operating force of the control lever 300 is minimal by the taper 700 and thus the operating force is uniformly maintained. Meanwhile, a tilt angle of the taper 700 is maintained at approximately 1° and is added and subtracted, if necessary.

In detail, when the control lever 300 is operated (tele-out) at the free end of the outer tube 200, as described above, as the rigidity of the outer tube 200 is minimal, the lever operating force of the control lever 300 is minimal, but in this case, the control lever 300 is positioned at a maximum tilt section of the taper 700 and thus the lever operating force is added.

On the other hand, when the control lever 300 is operated (tele-in) at the confinement end of the outer tube 200, as described above, as the rigidity of the outer tube 200 is maximized, the lever operating force of the control lever 300 is maximized, but in this case, the control lever 300 is positioned at a minimum tilt section of the taper 700 or a section without a tilt and thus the lever operating force of the control lever 300 is a little added or is no added.

Therefore, the lever operating force is uniformly maintained whether the position of the control lever 300 is positioned at the free end or the confinement end of the outer tube 200. The reason is that the deviation in the lever operating force of the control lever 300 compensates for by the taper 700.

That is, the deformation of the confinement end of the outer tube 200 is minimal and therefore when the lever operating force of the control lever 300 is large, the control lever 300 is positioned at the minimum tilt portion, such that the compensation of the additional lever operating force is small, while the deformation of the free end of the outer tube 200 is maximal and therefore when the lever operating force of the control lever 300 is small, the operating lever 300 is positioned at the maximum tilt portion of the taper 700, such that the compensation of the additional lever operating force is large. That is, the deviation in lever operating force of the control lever according to the position of the control lever 300 is minimal.

Consequently, as the deviation in the lever operating force of the control lever 300 is minimal, the sense of use is uniformly maintained.

Further, the taper 700 is provided with a reverse tilt part 710 as illustrated in FIG. 6(a) or a contact avoidance part 720 as illustrated in FIG. 6B, which serve to finely control a deviation in operating force of a compensation lever by the taper 700.

That is, the reverse tilt part 710 and the contact avoidance part 720 are a component to equalize the lever operating force as large as possible.

The drawings illustrate that the reverse tilt part 710 and the contact avoidance part 720 are formed at the maximum tilt angle portion of the taper 700, but if not particularly defined, it is to be noted that the reverse tilt part 710 and the contact avoidance part 720 may also be formed at the minimum tilt angle portion.

Further, as illustrated in FIGS. 7 and 8, the taper 700 is attached on the outer surface of the telescope guide 210 as a separate component.

For example, as illustrated in FIG. 7, the taper 700 is attached on the outer surface of the telescope guide 210 by a welding, as illustrated in FIG. 8, one of opposing surfaces of the taper 700 and the telescope guide 210 is provided with a coupling groove 701, and the other one of other opposing surfaces of the taper 700 and the telescope guide 210 on which the coupling groove 701 is not formed is provided with a coupling protrusion 702, such that the taper 700 may be attached on the outer surface of the telescope guide 210.

Further, as illustrated in FIG. 9, the taper 700 may also be integrally formed by machining the outer surface of the telescope guide 210.

In addition, the other portion of the outer tube 200 with which the other end of the first slit 220, that is, the second slit 230 is not provided is provided with a third slit 240 cut toward both sides of the circumferential direction.

In this case, when viewing the outer tube 200 from the top, the second slit 230 is formed in a round shape to make both ends thereof face the telescope guide 210.

Therefore, the outer tube 200 is provided with a rounded third slit 240 to minimize the deviation in operating force of the control lever 300. Further, the third slit 240 easily controls the deviation in the lever operating force by the round shape and length.

According to the steering column in accordance with the exemplary embodiments of the present invention, it is possible to minimize the deviation in a lever operating force of the control lever by the taper even though the position of the control lever is changed by the telescope operation.

That is, the sense of use of the control lever may be uniformly maintained by minimizing the deviation in operating force of the control lever, thereby improving the emotional quality.

Hereinabove, the exemplary embodiments of the present invention are described in detail, but the technical scope of the present invention is not limited to the foregoing exemplary embodiments and is to be construed as being limited by claims. In this case, the present invention may be variously modified and changed by those skilled in the art without departing from the scope of the present invention.

For example, the taper and the telescope guide may be fastened with each other by a mechanical fastening member such as a bolt.

What is claimed is:

1. A steering column, comprising:
    an inner tube;
    an outer tube having a hollow into which the inner tube is inserted and including a pair of telescope guides protruding from an outer circumferential surface of the outer tube, a first slit cut in an axial direction of the outer tube between the pair of the telescope guides, and a second slit cut along a circumference of the outer tube at one end of the first slit; and
    a control lever installed on the pair of the telescope guides,
    wherein the pair of the telescope guides have a taper that is formed obliquely along a lengthwise direction, and an operating force of the lever is substantially uniformly maintained according to a position of the control lever in the lengthwise direction by means of the taper.

2. The steering column of claim 1, wherein the taper is provided with a contact avoidance part.

3. The steering column of claim 1, wherein the taper is provided with a reverse tilt part.

4. The steering column of claim 1, wherein the taper is attached on an outer surface of each the pair of the telescope guides.

5. The steering column of claim 4, wherein the taper and the respective telescope guide are configured in a separation structure, one of opposing surfaces of the taper and the telescope guide is provided with a coupling groove, and another one of the opposing surfaces of the taper and the respective telescope guide on which the coupling groove is not formed is provided with a coupling protrusion.

6. The steering column of claim 1, wherein the taper is integrally formed with the respective telescope guide.

7. The steering column of claim 1, wherein another end of the first slit is provided with a third slit having a first curved portion and a second curved portion, the first and second curved portions of the third slit being disposed symmetrically with respect to a longitudinal axis of the first slit.

8. The steering column of claim 2, wherein the taper is attached on an outer surface of each of the pair of the telescope guides.

9. The steering column of claim 3, wherein the taper is attached on an outer surface of each of the pair of the telescope guides.

10. The steering column of claim 2, wherein the taper is integrally formed with each of the pair of the telescope guides.

11. The steering column of claim 3, wherein the taper is integrally formed with each of the pair of the telescope guides.

* * * * *